May 1, 1956

D. BAUM

PHONOGRAPH ATTACHMENT FOR ELIMINATING STATIC ELECTRICITY FROM RECORDS

Filed June 4, 1954

2,744,212

Inventor
David Baum
By B. B. Darvey
Atty.

United States Patent Office 2,744,212

Patented May 1, 1956

2,744,212

PHONOGRAPH ATTACHMENT FOR ELIMINATING STATIC ELECTRICITY FROM RECORDS

David Baum, Livermore Falls, Maine

Application June 4, 1954, Serial No. 434,612

1 Claim. (Cl. 317—2)

This invention pertains to a phonograph attachment for eliminating static electricity from the surface of a phonograph record.

It has, for many years, been known that the needle of a record player generates static electricity upon frictionally engaging the grooves in a rotating record. These electrostatic charges attract lint and dust which adhere to the record surface and resist efforts to remove them by wiping or brushing the record surface. Subsequent playing of a record in this condition scratches the surface, thereby producing foreign noises, distortion of the recording and "jumping" of the needle. Various chemicals have appeared on the market for eliminating this static electricity, but they tend to smear the record and are, in general, unsatisfactory.

It is the principal object of this invention therefore, to provide a phonograph attachment which is automatically operative to remove electrostatic charges from the playing surface of a phonograph record.

Another object is to provide a device of the character described which removes static electricity from a record while it is being played, thereby preventing electrostatic charges from building up when the phonograph needle frictionally engages the grooves of the rotating record.

Other objects of the invention will be apparent from the following description of the present preferred form of the invention taken in connection with the accompanying drawings, wherein.

Figure 1:
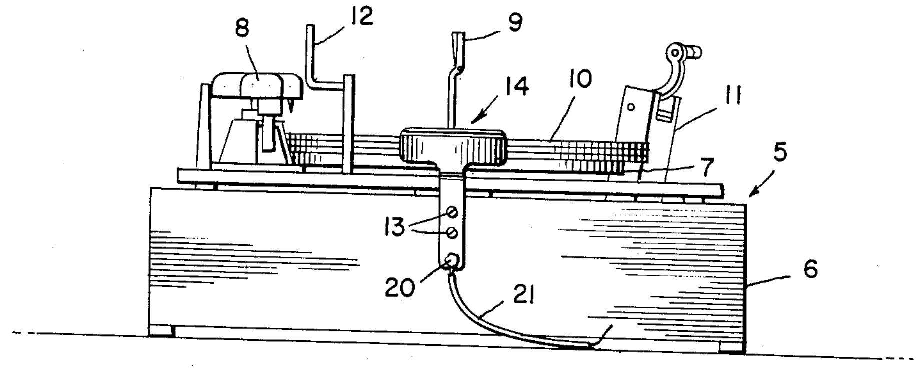
Fig. 1 is a elevational view of a phonograph illustrating the application of the present device.
Figures 2, 3:
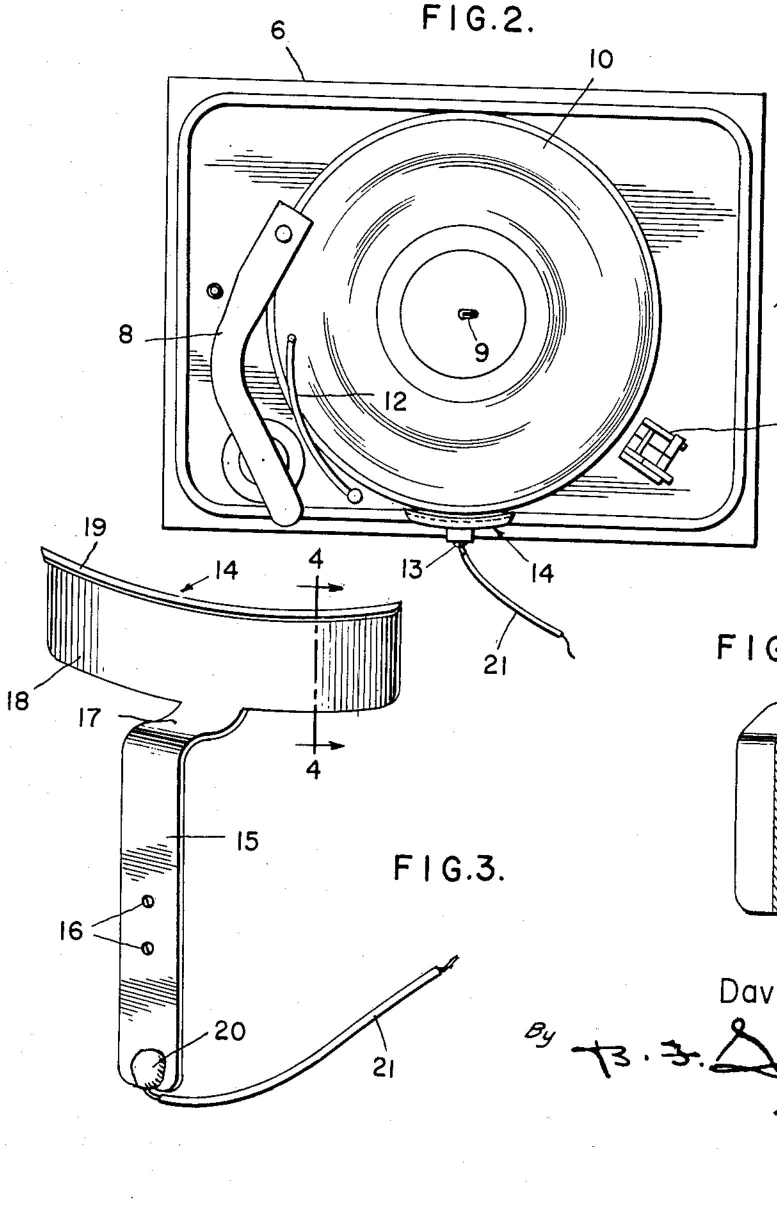
Fig. 2 is a top plan view of the same.
Fig. 3 is a perspective view of the phonograph attachment per se.

Referring now in greater detail to the drawings, I have shown in Figs. 1 and 2, a phonograph designated 5, including a base 6 generally constructed of a non-conducting material, on the top of which base is mounted a conventional turntable 7 and pick-up arm 8. Attached to the center of turntable 7 is a spindle 9 for the reception of phonograph records 10. For the purpose of automatically changing records, there is provided a platform 11 and record clip 12 which operate in a well known manner.

Figure 4:
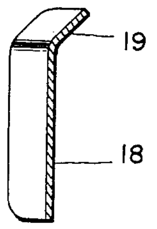
Fig. 4 is a sectional view taken along the lines 4—4 of Figure 3, looking in the direction of the arrows.

Attached to base 6 of phonograph 5, by suitable attaching means 13, is the attachment of the present invention, generally designated 14, constructed of a good conducting material, such as copper. As shown to advantage in Fig. 3, this attachment includes a vertical portion 15 provided with a plurality of openings 16 for the reception of attaching means 13. Near its upper terminus, portion 15 is bent at approximately a right angle, as shown at 17, to conform to the contour of the upper edge of base 6. Section 17 in turn, issues into an arcuate strip 18 which is adapted to complement the peripheral edge of record 10 and be positioned immediately adjacent thereto. The upper margin of strip 18 is bevelled, as indicated at 19 (see Fig. 4) in order to prevent "hanging" of any record suspended above turntable 7 and dropped by actuation of platform 11 and record clip 12 of the automatic record changer. To the lower end of vertical portion 15 there is secured, by welding 20 or other suitable means, a conductor 21, the free end of which is adapted to be connected to a ground, such as a water pipe or the like.

In use, it is important that attachment 14 be mounted on base 6 in such a manner that arcuate strip 18 is as close as possible to the record 10 without touching. Then, when record 10 is rotated on turntable 7 and the needle of pick-up arm 8 engages the record groove, friction builds up electrostatic charges on the record surface. The static electricity collected on the record then jumps the gap to the arcuate strip 18, from which point it passes through conductor 21 to the ground. This operation repeats itself over and over during the playing of the record and consequently static electricity is constantly grounded.

By means of the present attachment, phonograph records are kept free of static electricity with the result that any lint or dust which may collect on the surface thereof, may be easily removed by gentle wiping or brushing.

It is to be understood that various changes may be made in this invention, within the scope of the claim hereto appended.

What I claim is:

In a record player, an attachment for eliminating static electricity from the record surface including a conducting element connected to a ground and positioned immediately adjacent the peripheral edge of the record, said element being arcuate to conform to the contour of the peripheral edge of the record, the upper terminal of said element being bevelled to preclude the danger of interference with the automatic operation of the record player.

References Cited in the file of this patent

UNITED STATES PATENTS

| | | |
|---|---|---|
| 392,400 | Belfield | Nov. 6, 1888 |
| 836,576 | Hardwicke | Nov. 20, 1906 |
| 2,300,923 | Harnor | Nov. 3, 1942 |
| 2,449,972 | Beach | Sept. 28, 1948 |

FOREIGN PATENTS

| | | |
|---|---|---|
| 193,675 | Switzerland | Feb. 8, 1956 |